(12) United States Patent
Uchiyama et al.

(10) Patent No.: US 7,592,037 B2
(45) Date of Patent: Sep. 22, 2009

(54) FUEL CELL SEPARATOR, FUEL CELL STACK, FUEL CELL VEHICLE, AND METHOD OF MANUFACTURING THE FUEL CELL SEPARATOR

(75) Inventors: Noriko Uchiyama, Miura (JP);
Nobutaka Chiba, Yokohama (JP);
Yasutaka Nakamura, Yokosuka (JP);
Makoto Kano, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 336 days.

(21) Appl. No.: 11/578,265

(22) PCT Filed: Apr. 12, 2005

(86) PCT No.: PCT/JP2005/007372
§ 371 (c)(1),
(2), (4) Date: Oct. 13, 2006

(87) PCT Pub. No.: WO2005/101555
PCT Pub. Date: Oct. 27, 2005

(65) Prior Publication Data
US 2007/0243429 A1    Oct. 18, 2007

(30) Foreign Application Priority Data
Apr. 13, 2004  (JP) .............................. 2004-117976
Aug. 31, 2004  (JP) .............................. 2004-252947

(51) Int. Cl.
*H01M 8/24* (2006.01)
*H01M 2/00* (2006.01)

(52) U.S. Cl. ............................. 427/115; 429/18; 429/34
(58) Field of Classification Search .................. 429/18, 429/34; 427/115
See application file for complete search history.

(56) References Cited

U.S. PATENT DOCUMENTS

| 5,858,567 A | 1/1999 | Spear, Jr. et al. |
| 5,868,912 A | 2/1999 | Reichert et al. |
| 6,635,378 B1 | 10/2003 | Yang et al. |
| 2003/0091885 A1* | 5/2003 | Kobayashi et al. ............ 429/32 |

FOREIGN PATENT DOCUMENTS

| JP | 10-228914 A | 8/1998 |
| JP | 2000-353531 | * 12/2000 |
| JP | 2001-006713 A | 1/2001 |
| JP | 2001-236967 A | 8/2001 |

* cited by examiner

*Primary Examiner*—Patrick Ryan
*Assistant Examiner*—Thomas H. Parsons
(74) *Attorney, Agent, or Firm*—Foley & Lardner LLP

(57) ABSTRACT

A fuel cell separator (1) of the present invention has a base material (5) formed of titanium, and a nitride compound layer (6) composed of titanium and nitrogen and provided on a surface of the base material (5). In the fuel cell separator (1), the contact resistance which occurs between a gas diffusion layer and the separator (1) is low, the corrosion resistance is excellent, and the separator (1) can be manufactured at low cost.

11 Claims, 7 Drawing Sheets

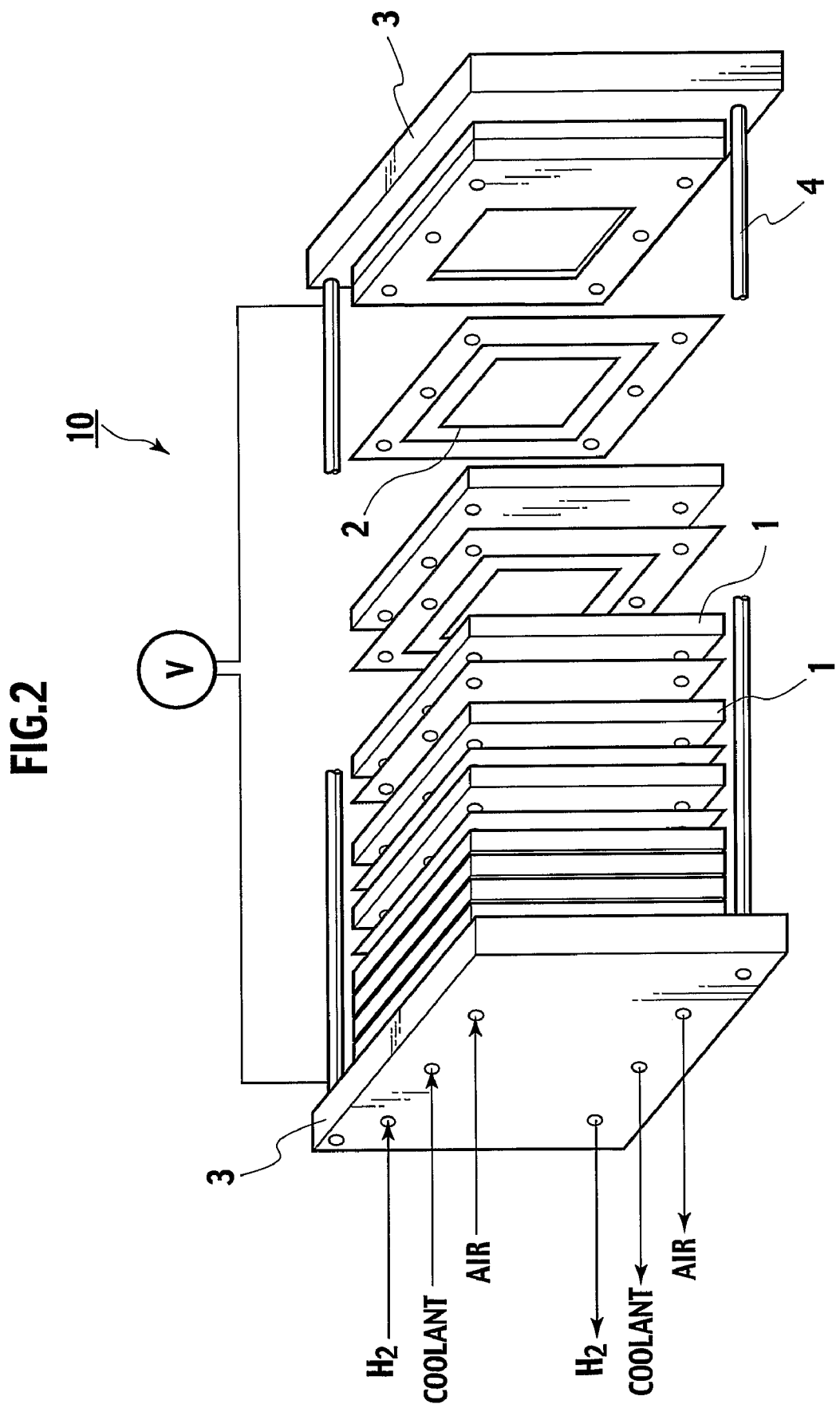

FIG.10

| | BASE MATERIAL | CRYSTAL STRUCTURE OF TiN PHASE | NITROGEN AMOUNT IN TiN PHASE (atom%) | VALUE OF x OF TiNx | ACTIVITY OF TITANIUM IN TiN PHASE | THICKNESS OF NITRIDE COMPOUND LAYER (μm) | NITROGEN AMOUNT ON SURFACE (atom%) | ELUSION AMOUNT OF TITANIUM ION (mg/L) | CONTACT RESISTANCE VALUE BEFORE TEST (mΩ·cm²) | CONTACT RESISTANCE VALUE AFTER TEST (mΩ·cm²) |
|---|---|---|---|---|---|---|---|---|---|---|
| EXAMPLE 10 | JIS CLASS 1 | TiN SINGLE PHASE | 51 | 1.04 | 0.00 | 0.5 | 50 | 0.1 | 5 | 5 |
| EXAMPLE 11 | JIS CLASS 1 | TiN SINGLE PHASE | 50 | 1.00 | 0.02 | 0.5 | 30 | 0.1 | 4 | 5 |
| EXAMPLE 12 | JIS CLASS 1 | TiN SINGLE PHASE | 48 | 0.90 | 0.06 | 0.3 | 45 | 0.1 | 4 | 5 |
| EXAMPLE 13 | JIS CLASS 1 | TiN SINGLE PHASE | 45 | 0.80 | 0.11 | 0.2 | 33 | 0.1 | 2 | 10 |
| EXAMPLE 14 | JIS CLASS 1 | TiN SINGLE PHASE | 40 | 0.67 | 0.17 | 0.2 | 48 | 0.1 | 3 | 13 |
| EXAMPLE 15 | JIS CLASS 1 | TiN SINGLE PHASE | 37 | 0.60 | 0.20 | 0.3 | 30 | 0.1 | 4 | 20 |
| EXAMPLE 16 | JIS CLASS 1 | TiN SINGLE PHASE | 48 | 0.90 | 0.06 | 0.2 | 67 | 0.1 | 5 | 5 |
| EXAMPLE 17 | JIS CLASS 1 | TiN SINGLE PHASE | 48 | 0.90 | 0.06 | 0.05 | 68 | 0.1 | 4 | 5 |
| EXAMPLE 18 | JIS CLASS 1 | TiN SINGLE PHASE | 48 | 0.90 | 0.06 | 1.1 | 30 | 0.1 | 4 | 4 |
| EXAMPLE 19 | JIS CLASS 1 | TiN SINGLE PHASE | 48 | 0.90 | 0.06 | 9.5 | 29 | 0.1 | 4 | 5 |
| COMPARATIVE EXAMPLE 7 | JIS CLASS 1 | ε-Ti₂N + TRACE AMOUNT OF TiN | – | – | – | 1 | 31 | 0.1 | 3 | 340 |
| COMPARATIVE EXAMPLE 8 | JIS CLASS 1 | ε-Ti₂N SINGLE PHASE | – | – | – | 0.3 | 30 | 0.1 | 4 | 1021 |
| COMPARATIVE EXAMPLE 9 | JIS CLASS 1 | α-Ti + ε-Ti₂N | – | – | – | 0.05 | 30 | 0.1 | 10 | 2178 |
| COMPARATIVE EXAMPLE 10 | JIS CLASS 1 | NONE | – | – | – | – | – | 0.1 | 530 | 3256 |

US 7,592,037 B2

FUEL CELL SEPARATOR, FUEL CELL STACK, FUEL CELL VEHICLE, AND METHOD OF MANUFACTURING THE FUEL CELL SEPARATOR

TECHNICAL FIELD

This invention relates to a fuel cell separator, a fuel cell stack, a fuel cell vehicle, and a method of manufacturing the fuel cell separator. In particular, this invention relates to a separator for a polymer electrolyte fuel cell, which is formed by using titanium.

BACKGROUND ART

From a viewpoint of global environment protection, it has been studied that a fuel cell is utilized as a power supply of a motor which operates in place of an internal combustion engine of a vehicle, and that the vehicle is driven by the motor. It is not necessary for this fuel cell to use a fossil fuel having a resource depletion problem, and accordingly, the fuel cell never generates exhaust gas. Moreover, the fuel cell has excellent features in that noise is hardly generated, further, that it is also possible to enhance energy collection efficiency more than those of engines using other energies, and the like.

According to types of electrolytes for use, in the fuel cell, there are a polymer electrolyte type, a phosphoric acid type, a molten carbonate type, a solid oxide type, and the like. A polymer electrolyte fuel cell (PEFC) as one among them is a cell which uses, as an electrolyte, a polymer electrolyte membrane having proton exchangers in molecules, and utilizes the behavior that the polymer electrolyte membrane functions as a proton-conductive electrolyte when being made hydrous in a saturated manner. The polymer electrolyte fuel cell operates at relatively low temperature, and has high power generation efficiency. Moreover, the polymer electrolyte fuel cell is compact and lightweight as other utilities are, and accordingly, various applications which include mounting thereof on an electric vehicle are expected.

The above-described polymer electrolyte fuel cell has a fuel cell stack. The fuel cell stack is integrally configured by stacking a plurality of single cells, sandwiching both ends thereof by end flanges, and being pressurized and held by fastening bolts. Each single cell is composed of the polymer electrolyte membrane, and of an anode (hydrogen electrode) and a cathode (oxygen electrode) which are joined to both ends thereof.

In FIG. 1, a configuration of the single cell which forms the fuel cell stack is shown. As shown in FIG. 1, a single cell 100 includes a membrane electrode assembly in which an oxygen electrode 102 and a hydrogen electrode 103 are integrated by being joined to both sides of a polymer electrolyte membrane 101. Each of the oxygen electrode 102 and the hydrogen electrode 103 has a two-layer structure including a reaction membrane 104 and a gas diffusion layer 105. The reaction membranes 104 are in contact with the polymer electrolyte membrane 101. On both sides of the oxygen electrode 102 and the hydrogen electrode 103, an oxygen electrode-side separator 106 and a hydrogen electrode-side separator 107 are placed individually. Moreover, by the oxygen electrode-side separator 106 and the hydrogen electrode-side separator 107, an oxygen gas passage, a hydrogen gas passage, and a coolant passage are formed.

The single cell 100 with the above-described configuration is manufactured in a manner that the oxygen electrode 102 and the hydrogen electrode 103 are placed on both sides of the polymer electrolyte membrane 101, are integrally joined usually by a hot press method to form the membrane electrode assembly, and next, the separators 106 and 107 are placed on both sides of the membrane electrode assembly. In a fuel cell composed of the above-described single cells 100, when mixed gas of hydrogen, nitrogen and steam is supplied to the hydrogen electrode 103 side and the air and steam are supplied to the oxygen electrode 102 side, an electrochemical reaction occurs mainly on contact surfaces of the polymer electrolyte membrane 101 and the reaction membranes 104. A more specific reaction is described below.

In the single cell 100 with the above-described configuration, when oxygen gas and hydrogen gas are supplied to the oxygen gas passage and the hydrogen gas passage, respectively, the oxygen gas and the hydrogen gas are supplied to the reaction membranes 104 through the respective gas diffusion layers 105, and in the respective reaction membranes 104, reactions to be shown below occur.

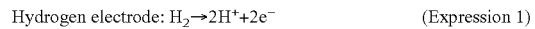

Hydrogen electrode: $H_2 \rightarrow 2H^+ + 2e^-$ (Expression 1)

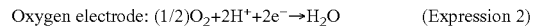

Oxygen electrode: $(1/2)O_2 + 2H^+ + 2e^- \rightarrow H_2O$ (Expression 2)

When the hydrogen gas is supplied to the hydrogen electrode 103, the reaction of Expression 1 progresses, and $H^+$ and $e^-$ are generated. $H^+$ moves through the inside of the polymer electrolyte membrane 101 and flows into the oxygen electrode 102, and $e^-$ flows from the hydrogen electrode 103 to the oxygen electrode 102 through a load 108. In the oxygen electrode 102, the reaction of Expression 2 progresses by $H^+$, $e^-$ and the supplied oxygen gas, and then electric power is generated.

As described above, the fuel cell separators, which are used for the fuel cell stack, have a function to electrically connect the respective single cells to each other. Accordingly, it is required for the separators to have good electrical conductivity and low contact resistance with constituent materials such as the gas diffusion layers. With regard to an overvoltage owing to resistance polarization in the fuel cell, in a stationary use, exhaust heat is collected by means of cogeneration and the like, and an improvement of thermal efficiency can be expected as a whole. However, in a use for the vehicle, with regard to a heat generation loss based on the contact resistance, there is no other way but to throw generated heat away from a radiator to the outside through the coolant. Accordingly, a large contact resistance leads to a decrease of the power generation efficiency. Moreover, this decrease of the efficiency is equivalent to an increase of heat generation, and accordingly, a necessity also arises that a larger cooling system should be installed. As described above, a decrease of the contact resistance is an important subject to be solved.

In addition, temperatures of the respective gases supplied to the fuel cell are as high as 80 to 90° C. Moreover, as described above, the hydrogen electrode where $H^+$ is generated and the oxygen electrode where the oxygen, the air and the like pass are in an acidic atmosphere where a degree of acidity (pH) is 2 to 3. Accordingly, for both of the oxygen electrode-side and hydrogen electrode-side separators, corrosion resistance against a strong acidic atmosphere is required. Therefore, as the separators, it is conceived to use stainless steel which has good electrical conductivity and the corrosion resistance. On the stainless steel, a passive film of which surface is dense, that is, chromium oxide ($CrO \cdot OH \cdot nH_2O$, $Cr_2O_3 \cdot xH_2O$) is formed, and accordingly, the stainless steel has excellent corrosion resistance. However, this passive film causes the contact resistance with carbon paper usually used as the gas diffusion layer.

In this connection, among separators formed by press-molding the stainless steel, a separator in which a gold-plated layer is directly formed on a surface contacting the electrode has been proposed (refer to Japanese Patent Laid-Open Publication No. H10-228914). Moreover, a separator has been proposed, in which the stainless steel and titanium are processed into the separator, the passive film on a surface contacting another member to cause the contact resistance is then removed, and noble metal or a noble metal alloy is adhered onto the surface (refer to Japanese Patent Laid-Open Publication No. 2001-6713). Furthermore, a separator has been proposed, in which two or more layers of metal nitrides different in type, such as titanium nitride (TiN) and chromium nitride (CrN), are formed on the surface of the stainless steel (refer to Japanese Patent Laid-Open Publication No. 2001-236967).

DISCLOSURE OF INVENTION

However, materials are expensive in the case of plating or coating the noble metal such as gold or the noble metal alloy on the surface of the separator. Moreover, in the case of using the stainless steel as the base material, when a single layer of the metal nitrides such as TiN and CrN is coated on the surface thereof, a residual stress in the layer is increased. Accordingly, there is a possibility that a defect occurs in the nitride compound layer, resulting in a deterioration of the corrosion resistance of the separator. Therefore, it is desirable to form the two or more layers of the metal nitrides, thus decreasing the defect in the nitride compound layers. However, in this case, a cost increase owing to an increase of manufacturing steps is inevitable.

This application of the invention has been made in consideration of the above-described problems. It is an object of this application to provide a fuel cell separator, in which contact resistances caused between the separator and the electrodes are low, corrosion resistance is excellent, and cost is low, and to provide a fuel cell stack, and a fuel cell vehicle mounting the fuel cell stack thereon.

The first aspect of the present invention provides a fuel cell separator comprising: a base material formed of titanium; and a nitride compound layer composed of titanium and nitrogen and provided on a surface of the base material.

The second aspect of the present invention provides a method of manufacturing a fuel cell separator comprising: preparing a base material formed of titanium; and performing a plasma nitriding treatment for forming a nitride compound layer formed of titanium and nitrogen on a surface of the base material.

The third aspect of the present invention provides a fuel cell stack comprising: a fuel cell separator including: a base material formed of titanium; and a nitride compound layer composed of titanium and nitrogen and provided on a surface of the base material.

The third aspect of the present invention provides a fuel cell vehicle, comprising: a fuel cell stack including the fuel cell separator, the separator having: a base material formed of titanium; and a nitride compound layer composed of titanium and nitrogen and provided on a surface of the base material.

BRIEF DESCRIPTION OF DRAWINGS

FIG. 2 is a configuration diagram of a fuel cell stack in the present invention;

FIG. 10 is a table showing evaluation results of Examples 10 to 19 and Comparative Examples 7 to 10.

BEST MODE FOR CARRYING OUT THE INVENTION

Figure 1:
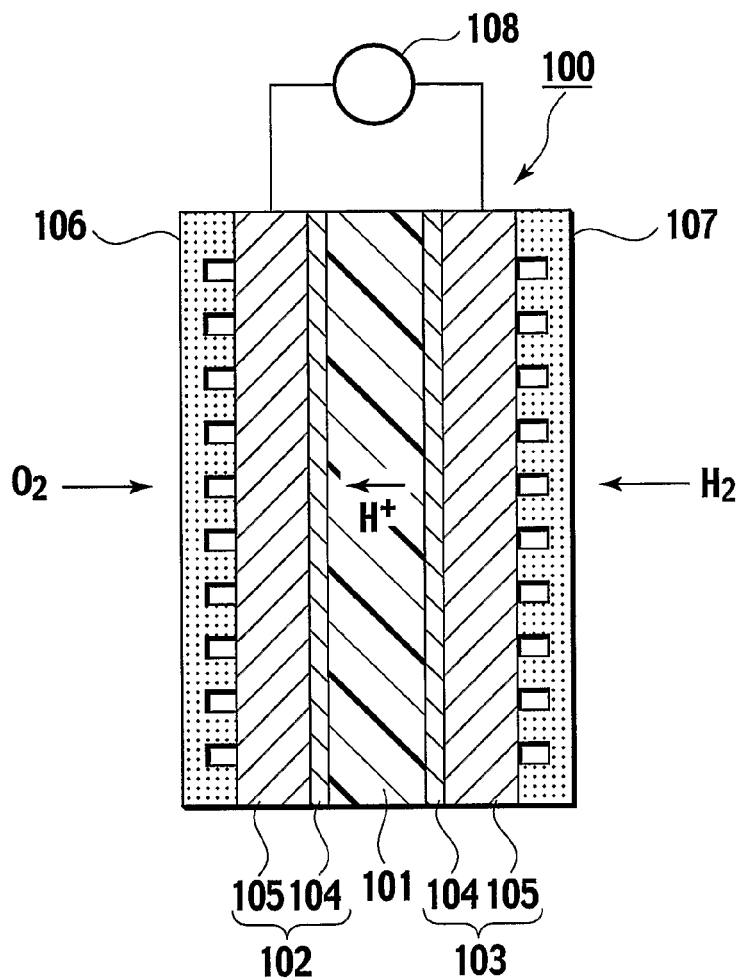
FIG. 1 is a cross-sectional view showing a configuration of a single cell forming a fuel cell stack.

Embodiments of the present invention will be explained below with reference to the drawings, wherein like numbers are designated by like reference characters.

(Fuel Cell Separator and Fuel Cell Stack)

An embodiment of a fuel cell separator and a fuel cell stack according to the present invention is described. The fuel cell separator according to the present invention is a fuel cell separator, which uses titanium as a base material, characterized in that a nitride compound layer composed of titanium and nitrogen is formed on a surface of the base material. Moreover, the fuel cell stack according to the present invention is characterized by using the fuel cell separator according to the present invention.

Figure 3:
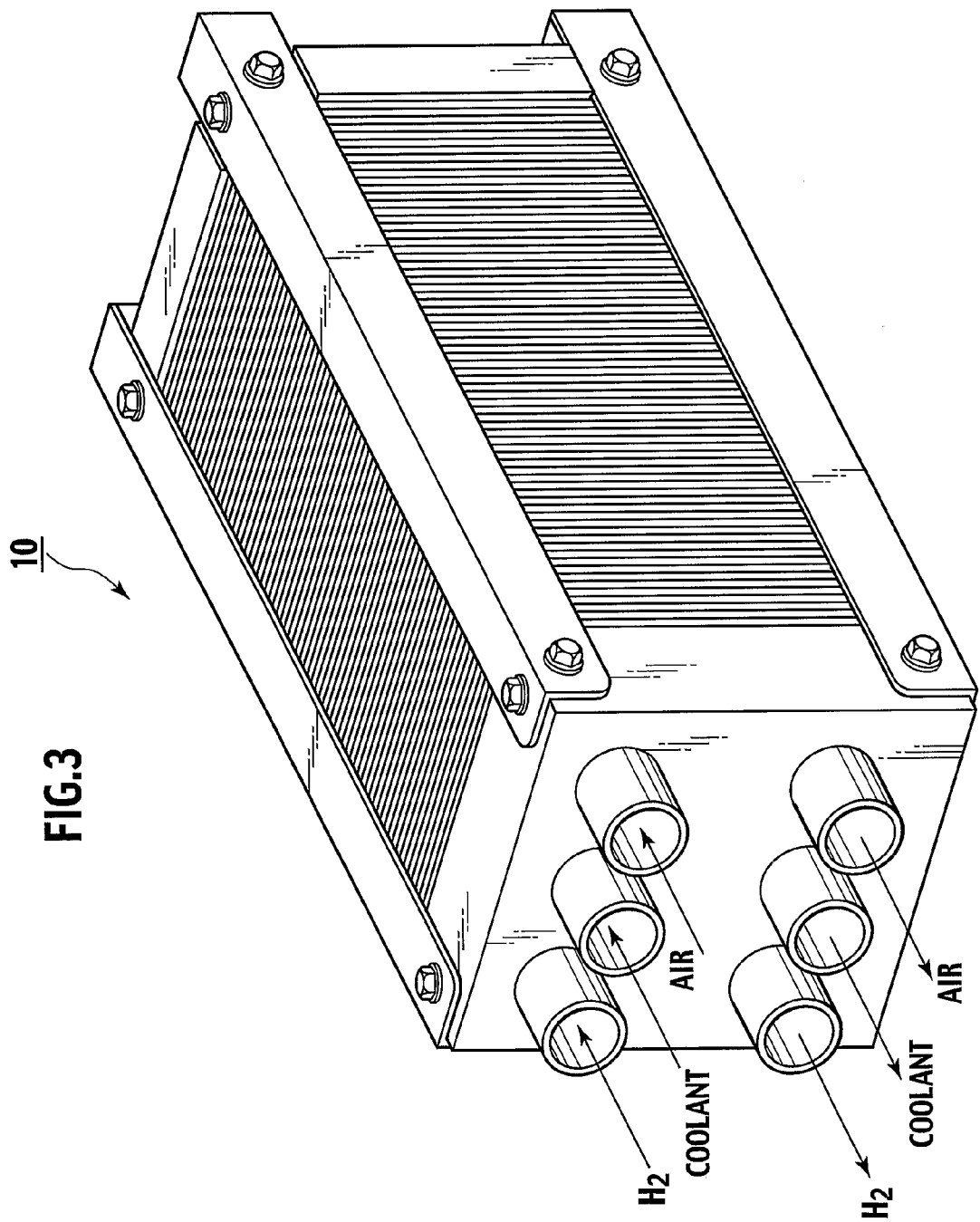
FIG. 3 is a perspective view showing the fuel cell stack in the present invention.

In FIG. 2, a part of a fuel cell stack 10 configured by using fuel cell separators 1 according to the present invention is schematically shown. As shown in FIG. 2, the fuel cell stack 10 is one formed by alternately stacking the plural fuel cell separators 1 and single cells 2. Each single cell 2 is formed into a membrane electrode assembly in a manner that a gas diffusion layer having an oxidant electrode (oxygen electrode) and a gas diffusion layer having a fuel electrode (hydrogen electrode) are formed on both surfaces of a polymer electrolyte membrane. Moreover, the fuel cell separators 1 are placed on both sides of the membrane electrode assembly. By the gas diffusion layers and the separators 1, an oxidant gas passage and a fuel gas passage are formed inside the single cell 2. As the polymer electrolyte membrane, a perfluorocarbon polymer membrane having sulfonic groups, and the like are usable. As the perfluorocarbon polymer membrane, Nafion 1128 (registered trademark) made by Du Pont Kabushiki Kaisha, and the like are usable. Then, after the separators 1 and the single cells 2 are stacked, as shown in FIG. 2, end flanges 3 are placed on both ends of the stacked object, peripheries of the flanges 3 are fastened by fastening bolts 4, and the fuel cell stack 10 is configured. Note that, in FIG. 3, the fuel cell stack 10 is shown in a perspective view.

Figure 4:
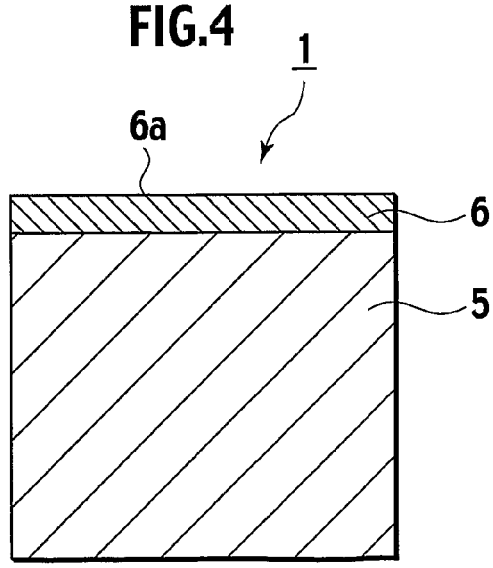
FIG. 4 is a cross-sectional view schematically showing a fuel cell separator in the present invention.

In the fuel cell separator 1 according to the present invention, titanium is used as a base material 5 as shown in FIG. 4, and on the surface of the base material, a nitride compound layer 6 composed of titanium and nitrogen is formed. Accordingly, the nitride compound layer 6 contributes to corrosion resistance in an acidic atmosphere, and the separator 1 can exert corrosion resistance exceeding that of stainless steel. Moreover, the nitride compound layer 6 using titanium as the base material 5 is provided, thus making it possible to suppress, to low, contact resistance with carbon paper usually used as the gas diffusion layer. Furthermore, even if two or more layers of metal nitrides different in type, such as titanium nitride (TiN) and chromium nitride (CrN), are not formed on the surface of the stainless steel as before, the separator 1 is excellent in corrosion resistance. Further, the nitride compound layer 6 can suppress the contact resistance even if a gold-plated layer is not directly formed on a surface in contact with the electrode. Accordingly, it is made possible to realize cost reduction.

Here, as general features of titanium, mentioned are that processability thereof is good, and that titanium has corrosion resistance exceeding that of the stainless steel because an oxide film is formed on the surface thereof in the acidic atmosphere. Moreover, titanium is one excellent in corrosion resistance in an acidic atmosphere where pH is 2 to 3. However, in the case of using titanium as it is without modifying the surface thereof in a state where the oxide film is present on the surface thereof, a value of the contact resistance on the contact surface with the carbon paper is increased, and accordingly, it is difficult to use the above-described titanium as it is as a separator. As opposed to this, in the case of performing nitriding for the surface of titanium to form the nitride compound layer thereon, it is made possible to suppress the value of the contact resistance to a low level with the carbon paper as the gas diffusion layer, and to keep high electrical conductivity. Moreover, even if a crack occurs in the nitride compound layer by press-molding the separator after the nitride compound layer is formed, titanium as the base material is one excellent in corrosion resistance in the strong acidic atmosphere where pH is 2 to 3, and accordingly, the excellent corrosion resistance and electrical conductivity can be maintained. As described above, titanium is used as the base material, and further, the nitride compound layer composed of titanium and nitrogen is formed on the surface of the base material, and accordingly, there is also an effect that applied conditions when the separator is molded is relaxed.

Furthermore, it is desirable that titanium as the base material be industrial pure titanium. The industrial pure titanium has high purity in particular, and far better performance is obtained in terms of the processability and the corrosion resistance. Moreover, a density of the industrial pure titanium is approximately 60% of that of the stainless steel, and accordingly, is easy to process, and it is made possible to thin a plate thickness thereof. Therefore, though a unit price of the industrial pure titanium is 1.3 times as expensive as that of the stainless steel, it is made possible to suppress cost to lower than in the case of using the stainless steel by thinning the plate thickness. Furthermore, the plate thickness of the separator can be thinned, and accordingly, it is made possible to offer a lightweight fuel cell separator, and further, a lightweight fuel cell stack.

As the industrial pure titanium, it is preferable to use one of the JIS Class 1 standardized according to the Japanese Industrial Standards. Titanium of the JIS Class 1 has high purity in particular, and is excellent in corrosion resistance. Quality of titanium of the JIS Class 1 is defined according to JIS H4600 (Titanium and titanium alloy sheets, plates and strips). Chemical components of titanium of the JIS Class 1 are shown in Table 1.

TABLE 1

| Components | Contents |
| --- | --- |
| N | 0.03% or less |
| C | 0.08% or less |
| Fe | 0.013 or less |
| O | 0.20% or less |
| Al | 0.15% or less |
| V | — |
| Ru | — |
| Pd | — |
| Ta | — |
| Co | — |
| Cr | — |
| Ni | — |
| S | — |
| La + Ce + Pr + Nd | — |
| Ti | Rest |

Moreover, it is preferable that the above-described nitride compound layer 6 include a titanium nitride phase in a range within a depth of 20 nm from a surface 6a on a side contacting the electrode.

Figure 5:
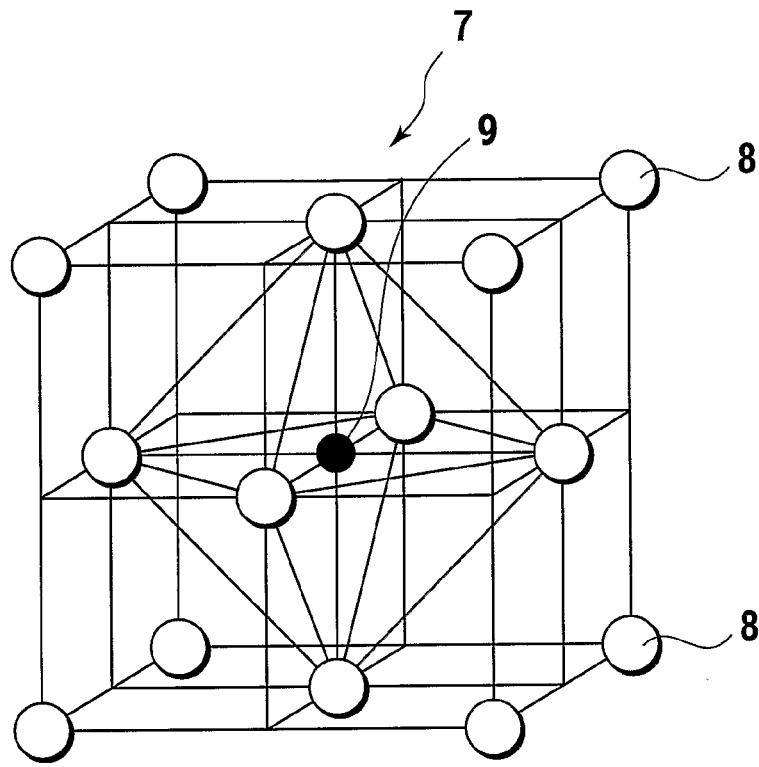
FIG. 5 is a schematic view showing a crystal structure of a titanium nitride phase.

Titanium nitride phase has a crystal structure where a nitrogen atom enters a gap position of an octahedron in a face-centered cubic lattice, that is, a crystal structure of a NaCl-type structure. Specifically, as shown in FIG. 5, a crystal structure 7 of titanium nitride is an interstitial solid solution in which a nitrogen atom 9 enters a gap of an octahedron at the center of unit cells of a face-centered cubic lattice of titanium atoms 8. The nitrogen atom 9 is located at lattice coordinates (1/2, 1/2, 1/2) of the respective unit cells when represented by means of a space lattice.

Figure 6:
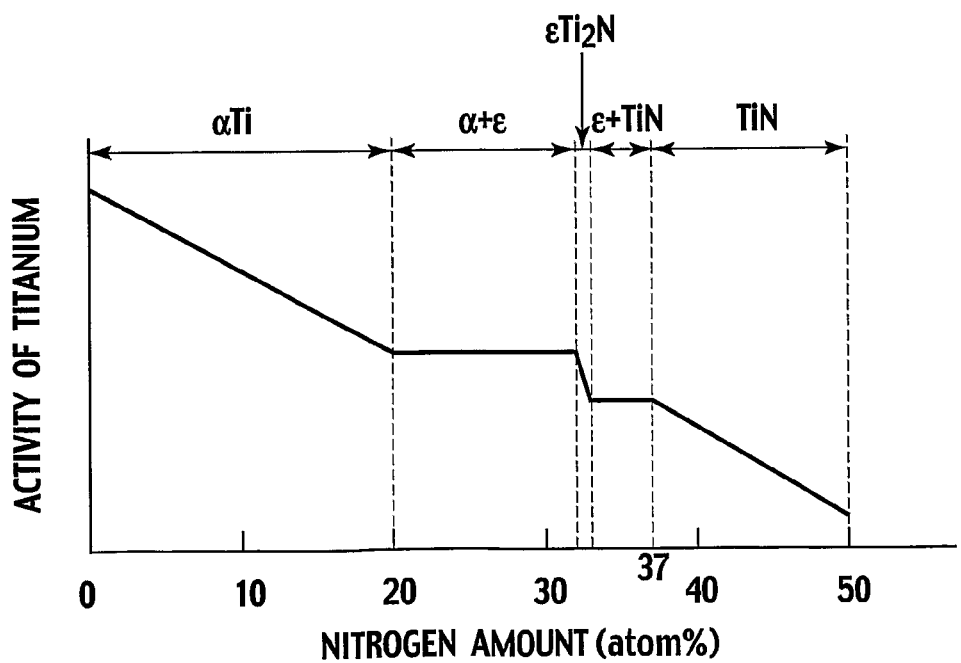
FIG. 6 is a view showing a relationship between an activity of titanium and an amount of nitrogen in the titanium nitride phase.

Moreover, it is preferable that an amount of nitrogen in the titanium nitride phase be 37 atom % or more. In FIG. 6, a relationship between the amount of nitrogen and activity of titanium is shown. Note that an axis of abscissas of FIG. 6 represents the amount of nitrogen (atom %), and an axis of ordinates thereof represents the activity ($a_{Ti}$) of titanium. As shown in FIG. 6, it is understood that the activity of titanium is decreased as the amount of nitrogen is increased, and that a chemical stability of the nitride compound is enhanced. In particular, the amount of nitrogen in the titanium nitride phase is regulated to be 37 atom % or more, thus making it possible to decrease the activity of titanium and to lower reactivity of titanium in titanium nitride to oxidation. Moreover, it is more preferable to set the amount of nitrogen in the titanium nitride phase at 45 atom % or more. As shown in FIG. 6, the amount of nitrogen is regulated to be 45 atom % or more, and thus a chemical potential of nitrogen can be enhanced, the activity of titanium can be suppressed to a further lower level, and the reactivity of titanium in titanium nitride to the oxidation can be suppressed to a low level. Specifically, a region of several ten nanometers depth from the surface of the nitride compound layer is enriched with nitrogen, and thus a generation of titanium oxide is restricted, and the value of the contact resistance with the adjacent gas diffusion layer can be set at a low value.

Moreover, in the case of expressing a nonstoichiometric composition in the titanium nitride phase as TiNx, it is preferable that x be within a range of: $0.6 \leq x \leq 1.05$. The composition of the titanium nitride phase is regulated within this range, and thus the activity of titanium in the titanium nitride phase can be suppressed to low, and the reactivity of titanium to the oxidation can be lowered. As a result, the chemical stability of the nitride compound layer is enhanced even in the acidic atmosphere, and accordingly, the contact resistance of the separator and the gas diffusion layer can be maintained at a low value while the fuel cell is being used. Moreover, it is more preferable that x described above of TiNx be set within a range of: $0.8 \leq x \leq 1.05$. The composition is regulated within this range, and thus the activity of titanium can be further decreased, the reactivity of titanium of titanium nitride to the oxidation can be lowered, and the contact resistance under the acidic atmosphere can be set at a further lower value.

In the nitride compound layer of the above-described fuel cell separator, it is preferable that the above-described titanium nitride phase be present on the surface 6a on the side contacting the electrode of the above-described nitride compound layer, and that the titanium nitride phase occupy 50% or more of a surface area thereof. The reason that a ratio of the titanium nitride phase is regulated in this range is because there is a possibility that an area capable of conducting electricity therethrough becomes extremely small when the surface area falls to less than 50%, leading to an increase of the contact resistance.

Moreover, when the activity of titanium in the base material is set at 1, it is preferable that the activity $a_{Ti}$ of titanium in the titanium nitride phase be 0.2 or less. The reason that the activity $a_{Ti}$ of titanium is regulated within this range is because, when the activity $a_{Ti}$ of titanium exceeds 0.2, the chemical stability of the nitride compound layer is decreased, and the nitride compound layer becomes prone to be oxidized, leading to a decrease of the electrical conductivity.

In the fuel cell separator, which is configured as described above, it is preferable that a ratio of the thickness of the nitride compound layer and the thickness of the base material be within a range from 1/2000 to 1/5 inclusive. Specifically, when the plate thickness of the base material is 0.1 mm, it is preferable that, on the surface of the base material, the nitride compound layer be formed within a thickness ranging from 0.05 μm to 20 μm inclusive per surface. Moreover, it is more preferable that the ratio of the thickness of the nitride compound layer and the thickness of the base material be within a range from 1/1000 to 1/10 inclusive. Specifically, when the plate thickness of the base material is 0.1 mm, it is preferable that, on the surface of the base material, the nitride compound layer be formed within a thickness ranging from 0.1 μm to 10 μm inclusive per surface. In this case, the corrosion resistance in the strong acidic atmosphere is excellent, the contact resistance with the carbon paper can be suppressed, and further, it is made possible to ensure excellent conductivity. Note that, when the thickness of the nitride compound layer becomes lower than 0.05 μm, it is difficult to suppress the contact resistance with the carbon paper to low. Moreover, a crack occurs in the nitride compound layer, and the separator becomes prone to be covered with a film of an oxide such as $TiO_2$, which exhibits an insulating property, and accordingly, it is difficult to ensure the conductivity. Meanwhile, when the thickness of the nitride compound layer exceeds 20 μm, a crack occurs in the nitride compound layer owing to a stress in the nitride compound layer, and the nitride compound layer becomes prone to fall off from the base material. Moreover, an oxide film becomes prone to be formed in a region from which the nitride compound layer has fallen off, and therefore, there is a possibility that the conductivity is deteriorated because the value of the contact resistance with the carbon paper is increased. Furthermore, there occurs a risk that the base material itself is broken owing to the crack in the nitride compound layer.

In the above-described nitride compound layer, it is preferable that, with regard to the composition of the surface contacting the gas diffusion layer, nitrogen be 30 atom % or more, and oxygen be 30 atom % or less. In this case, the contact surface of the nitride compound layer and the gas diffusion layer will be covered not with the film of the oxide such as $TiO_2$ exhibiting the insulating property, but with the nitride compound layer. The contact resistance of the nitride compound layer with the gas diffusion layer is low, and accordingly, it is made possible to ensure the conductivity between the base material and the carbon paper. On the contrary, when nitrogen falls to less than 30 atom %, or when the oxygen exceeds 30 atom %, the contact resistance is increased, and the conductivity is deteriorated. Note that the composition of the surface means a composition in a range of 5 nm depth from the surface.

Moreover, in the nitride compound layer of the above-described fuel cell separator, it is preferable that the content (atom %) of nitrogen be equal to or more than the content (atom %) of oxygen in a range of 10 nm depth from the surface 6a on the side contacting the electrode. The contents are regulated as described above, and thus the contact resistance with the gas diffusion layer can be set at a further lower value.

In such a way, the above-described configuration is adopted, and thus the fuel cell separator according to the present invention is excellent in corrosion resistance, cost thereof is low, and productivity thereof is good. In addition, the contact electrical resistance with the adjacent constituent material such as the gas diffusion layer is low, and it is made possible to obtain a fuel cell separator, in which power generation performance of the fuel cell is good. Moreover, the fuel cell stack according to the present invention uses the fuel cell separator according to the present invention, and thus can maintain high power generation efficiency without damaging the power generation performance, and it is made possible to realize downsizing and cost reduction thereof.

(Method of manufacturing Fuel Cell Separator)

A method of manufacturing the fuel cell separator according to the present invention is described. This method of manufacturing the fuel cell separator is characterized by including the step of forming the nitride compound layer on the surface of the base material by performing a plasma nitriding treatment for the base material formed of titanium.

In the nitriding treatment, there are a gas nitriding method, a gas nitrocarburizing method, a salt bath method, a plasma nitriding method, and the like. Among such nitriding treatments, the plasma nitriding method is a method for nitriding the surface of the base material, in which a subject to be treated is used as a cathode, nitrogen gas is ionized by a glow discharge generated by application of a direct-current voltage, and the ionized nitrogen is accelerated and made to collide against the surface of the subject to be treated at high speed. Titanium has an extremely strong affinity for oxygen, nitrogen, hydrogen, carbon, and the like, and accordingly, easily reacts therewith at high temperature, and forms compounds. However, in this plasma nitriding method, the treatment is performed in vacuum where a partial pressure of the oxygen is low. Accordingly, the content of oxygen in the nitride compound layer can be suppressed to a low level, and thus the contact resistance with the gas diffusion layer adjacent to the separator can be suppressed to a low level. Moreover, it is not necessary to provide plural metal nitride layers on the surface of the base material, and accordingly, the fuel cell separator can be obtained at low cost. Note that, in the case of performing the nitriding treatment by the gas nitriding method, the content of oxygen in the nitride compound layer is increased, and accordingly, the value of the contact resistance is increased.

Note that it is preferable that the nitriding treatment step be performed within a temperature range from 500° C. to 890°

C. exclusive. In the case of performing the plasma nitriding at a temperature lower than 500° C., the separator becomes less prone to be nitrided and more prone to be oxidized. Therefore, on the contact surface with the carbon paper in the nitride compound layer, the amount of nitrogen falls to less than 30 atom %, and the amount of oxygen exceeds 30 atom %, and accordingly, the value of the contact resistance is increased. Meanwhile, in the case of performing the plasma nitriding at a temperature of 890° C. or more, though the amount of nitrogen rises to 30 atom % or more, the amount of oxygen also exceeds 30 atom %, and accordingly, the value of the contact resistance is increased. Therefore, it is preferable that the nitriding treatment step be performed at the temperature of 500° C. or more to less than 890° C. Note that an allotropic transformation point of pure titanium is 882° C., and at 882° C. or more, the pure titanium turns from α (hcp structure) to β (bcc structure). In the β range, it is conceived that, though the pure titanium is easily transformed, the pure titanium becomes chemically active, and accordingly, the oxide film is prone to grow, and further, the pure titanium becomes prone to be fragile. Therefore, it is preferable that the nitriding treatment step be performed at the temperature of 500° C. or more to less than 882° C.

Furthermore, it is preferable that the method include the step of forming the base material into a shape of the separator by press-molding the base material after the nitriding treatment step. In the case of press-molding the base material into the separator shape after performing the nitriding treatment, the nitriding treatment step and an annealing step in a rolling step of the base material, which is performed in the step before the nitriding treatment, can be continuously performed in approximately equal temperature ranges, and accordingly, it is made possible to reduce the manufacturing steps and the cost.

As described above, by using the method of manufacturing the fuel cell separator in the present invention, with regard to the composition of the surface of the nitride compound layer, nitrogen rises to 30 atom % or more, and the oxygen falls to 30 atom % or less. Therefore, the contact resistance of the separator and the gas diffusion layer can be lowered. Moreover, the corrosion resistance is excellent, and it is made possible to easily manufacture the fuel cell separator at low cost.

(Fuel Cell Vehicle)

As an example of a fuel cell vehicle, an electric vehicle is mentioned and explained, which uses, as a power supply, a fuel cell including the fuel cell stack fabricated by the above-described method.

Figure 7A:
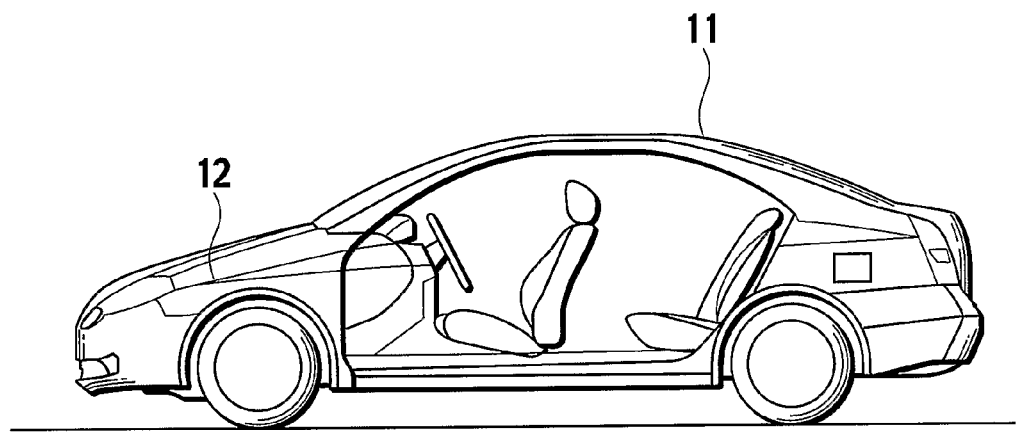
FIG. 7A is a side view showing an exterior appearance of an electric vehicle mounting the fuel cell stack in the present invention thereon.
Figure 7B:
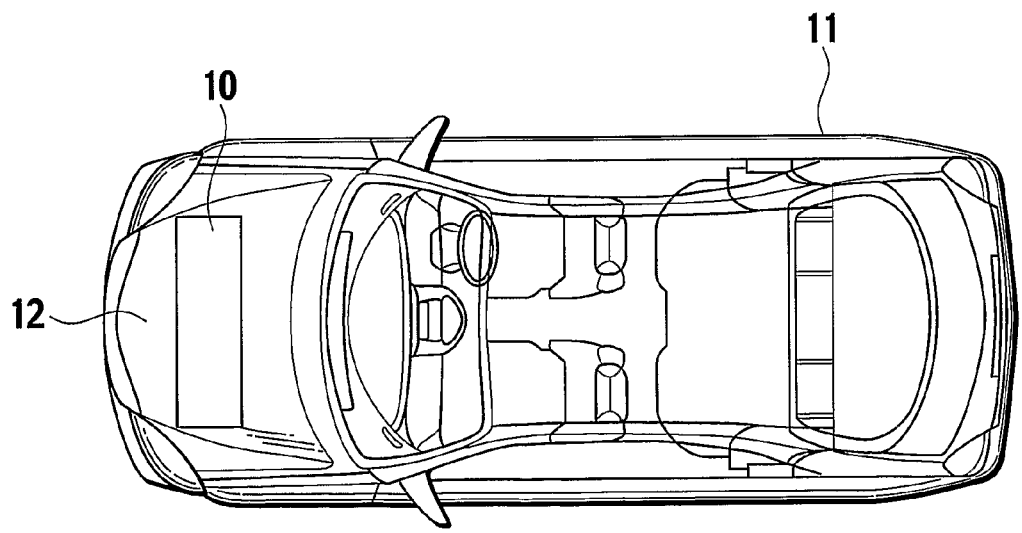
FIG. 7B is a plan view showing the exterior appearance of the electric vehicle mounting the fuel cell stack in the present invention thereon.

In FIG. 7A and FIG. 7B, exterior appearances of the electric vehicle mounting the fuel cell stack thereon are shown. As shown in FIG. 7B, in a front portion of a vehicle body 11, an engine compartment unit 12 is formed, which is formed by assembling, welding and joining left and right front side members and hoodridges, and a dashboard lower member coupling the left and right hoodridges including the front side members to each other. In the electric vehicle according to the embodiment of the present invention, the fuel cell stack 10 is mounted in the engine compartment unit 12.

The fuel cell stack to which the fuel cell separator according to the embodiment of the present invention is applied is mounted on the vehicle, and thus an improvement of a fuel consumption of the electric vehicle can be achieved. Moreover, according to this embodiment, the downsized lightweight fuel cell stack is mounted on the vehicle, and thus a weight of the vehicle is reduced to make it possible to achieve a fuel saving, and an elongation of a running distance can be achieved. Moreover, according to this embodiment, the compact fuel cell is mounted on the vehicle and the like, a space in a vehicle cabin can be more widely utilized, and a degree of freedom in styling can be ensured.

Note that, though the electric vehicle is mentioned as an example of the fuel cell vehicle, the present invention is not limited to the vehicle such as the electric vehicle, and is also applicable to engines of an airplane and others, which require electrical energy.

Effectiveness in using titanium as the base material and effectiveness of the plasma nitriding method are specifically described below based on Examples 1 to 9, Comparative Examples 1 to 6, and Reference Examples 1 and 2.

(Preparation of Samples)

In each of Examples 1 and 2, Examples 4 to 9, Comparative Examples 2 to 6, and Reference Examples 1 and 2, industrial pure titanium with a plate thickness of 0.1 mm was used as the base material, and in Example 3, industrial pure titanium with a plate thickness of 0.05 mm was used. One of the JIS Class 1 was used as the industrial titanium. In Comparative Example 1, austenitic stainless steel material with a plate thickness of 0.1 mm was used as the base material after being degreased and cleaned. As the austenitic stainless steel material, one obtained by performing bright annealing for SUS316L was used.

In each of Examples 1 to 9, Comparative Examples 4 to 6, and Reference Examples 1 and 2, the plasma nitriding treatment was performed for both surfaces of the base material under conditions where a treatment temperature was 400 to 900° C., a treatment time was 1 to 120 minutes, a gas mixing ratio of $N_2$ to $H_2$ was 1:1, a treatment pressure was 1 Torr (=133 Pa). Note that, in Comparative Example 2, the plasma nitriding treatment was not performed. Moreover, in Comparative Example 3, the gas nitrocarburizing was performed as the nitriding treatment under conditions where the treatment temperature was 700° C., and the treatment time was 5 minutes. In Table 2, the used base materials and the nitriding conditions are shown. Moreover, the respective samples were evaluated by methods to be described below.

TABLE 2

| | Base material | Plate thickness (mm) | Nitriding method | Nitriding temperature (° C.) | Nitriding time (min.) |
| --- | --- | --- | --- | --- | --- |
| Example 1 | Ti | 0.1 | plasma nitriding method | 600 | 60 |
| Example 2 | Ti | 0.1 | plasma nitriding method | 600 | 5 |
| Example 3 | Ti | 0.05 | plasma nitriding method | 600 | 5 |

TABLE 2-continued

| | Base material | Plate thickness (mm) | Nitriding method | Nitriding temperature (° C.) | Nitriding time (min.) |
|---|---|---|---|---|---|
| Example 4 | Ti | 0.1 | plasma nitriding method | 600 | 10 |
| Example 5 | Ti | 0.1 | plasma nitriding method | 500 | 5 |
| Example 6 | Ti | 0.1 | plasma nitriding method | 700 | 5 |
| Example 7 | Ti | 0.1 | plasma nitriding method | 800 | 5 |
| Example 8 | Ti | 0.1 | plasma nitriding method | 800 | 60 |
| Example 9 | Ti | 0.1 | plasma nitriding method | 880 | 5 |
| Comparative Example 1 | SUS316L | 0.1 | plasma nitriding method | 500 | 5 |
| Comparative Example 2 | Ti | 0.1 | — | — | — |
| Comparative Example 3 | Ti | 0.1 | gas nitrocarburizing method | 700 | 5 |
| Comparative Example 4 | Ti | 0.1 | plasma nitriding method | 400 | 5 |
| Comparative Example 5 | Ti | 0.1 | plasma nitriding method | 890 | 5 |
| Comparative Example 6 | Ti | 0.1 | plasma nitriding method | 900 | 5 |
| Reference Example 1 | Ti | 0.1 | plasma nitriding method | 600 | 1 |
| Reference Example 2 | Ti | 0.1 | plasma nitriding method | 850 | 120 |

(Measurement of Atomic Composition Ratio of Surface of Nitride Compound Layer)

An atomic composition ratio on the surface of the nitride compound layer was obtained by performing X-ray photoelectron spectroscopy (XPS) for the surface of the base material subjected to the nitriding treatment. As an apparatus, a photoelectron spectroscopic analyzer Quantum-2000 made by ULVAC-PHI, Incorporated was used. The measurement was performed by irradiating the surface of the nitride compound layer with an X-ray under conditions where a monochromated-Al-k$\alpha$ ray (voltage: 1486.6 eV, 20.0W) was used as a radiation source, a photoelectron extraction angle was 45°, a measuring depth was approximately 4 nm, and a measured area was $\Phi$200 µm. Then, from a ratio of peak areas of obtained spectra, the atomic composition ratio of the nitrogen atoms and the oxygen atoms on the surface of the nitride compound layer was obtained.

(Measurement of Thickness of Nitride Compound Layer)

A cross section of a planar base material subjected to the nitriding treatment was corroded by aqua regia after being polished. The cross section was observed under 400 times magnification by using an optical microscope, or the cross section was observed under 1000 to 10000 times magnification by using a scanning electron microscope (S-4000 made by Hitachi, Ltd.). Thus, the thickness of the nitride compound was measured.

(Measurement of Value of Contact Resistance)

Figure 8:
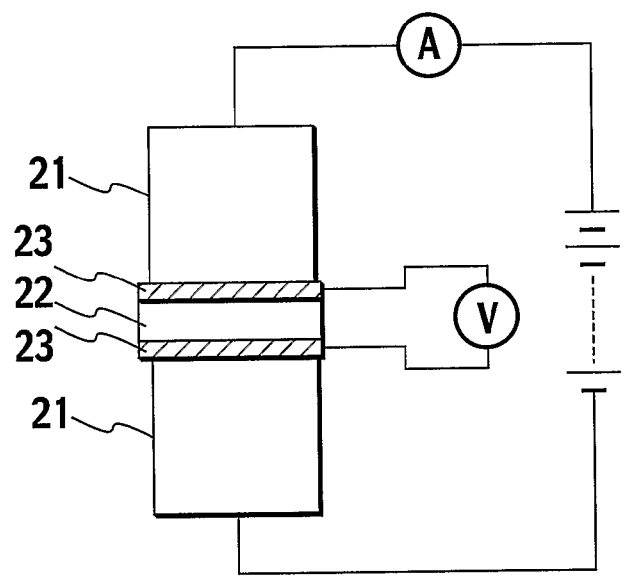
FIG. 8 is a schematic view explaining a measurement method of contact resistances of samples obtained in Examples and Comparative Examples.

Each of the samples obtained in Examples 1 to 9, Comparative Examples 1 to 6, and Reference Examples 1 and 2 was cut into a size of 30 mm×30 mm, and the contact resistance thereof was measured. As an apparatus, a contact electrical resistance measuring apparatus TRS-2000SS type made by ULVAC-RIKO, Inc. was used. Then, as shown in FIG. 8, platinum-supported carbon papers 23 were interposed between electrodes 21 and a sample 22, and a configuration was made, in which the electrode 21, the platinum-supported carbon paper 23, the sample 22, the platinum-supported carbon paper 23 and the electrode 21 were stacked in this order. Electrical resistance when a current of 1 A/cm$^2$ flowed under a condition where a measured surface pressure was 1.0 MPa was measured twice, and a mean value thereof was obtained. Note that, as the platinum-supported carbon paper, one formed by coating carbon black having platinum supported thereon onto carbon paper was used. As the carbon paper, carbon paper TGP-H-090 made by Toray Industries, Inc. was used. With regard to the TGP-H-090, a thickness is 0.26 mm, a bulk density is 0.49 g/cm$^3$, a porosity is 73%, a gas permeability is 37 mmaq/mm, and a volume resistivity in the thickness direction is 0.07 Ω·cm$^2$. Moreover, as the electrode, a Cu-made electrode of $\Phi$20 was used.

(Evaluation of Corrosion Resistance)

First, a planar plate with a dimension of 150 mm×150 mm was cut out from each base material subjected to the nitriding treatment. Then, a gas passage portion (interdigitation-type passage with a dimension of 100 mm×100 mm) was provided in each base material by press molding, and the separator was formed. Moreover, the separator was cut into a size of 30 mm×30 mm, and a potentiostatic electrolysis as an electrochemical method was performed therefor. Thereafter, a corrosion current density was measured, and a degree of lowering of the corrosion resistance was evaluated.

In the fuel cell, an electric potential of approximately 1 VvsSHE is applied to the oxygen electrode side at the maximum in comparison with the hydrogen electrode side. The polymer electrolyte membrane is one formed by making a polymer electrolyte film hydrous in a saturated manner, the polymer electrolyte film having proton exchangers such as sulfonic groups in molecules. The polymer electrolyte membrane exhibits strong acidity. Therefore, a corrosion current density after being held for a fixed time in a state where the potential is applied thereto was measured, and the corrosion resistance was evaluated. Note that, as conditions of the potentiostatic electrolysis, a sulfuric acid solution of pH 2 was used, the temperature was set at 80° C., the potential of 1 VvsSHE was applied, and a holding time was set at 100 hours.

The atomic composition ratio of the nitrogen atoms and the oxygen atoms, the thickness of the nitride compound layer, the value of the contact resistance and the corrosion current density in each of Examples 1 to 9, Comparative Examples 1 to 6, and Reference Examples 1 and 2, which are described above, are shown in Table 3.

TABLE 3

|  | Amount of nitrogen (atom %) | Amount of oxygen (atom %) | Thickness (μm) | Contact resistance value (Ω·cm²) | Corrosion current density (μA/cm²) |
| --- | --- | --- | --- | --- | --- |
| Example 1 | 44 | 20 | 2.5 | 2.1 | 0.02 |
| Example 2 | 36 | 14 | 0.7 | 3.4 | 0.04 |
| Example 3 | 35 | 17 | 0.8 | 2.3 | 0.04 |
| Example 4 | 39 | 11 | 1.1 | 3.1 | 0.04 |
| Example 5 | 32 | 13 | 0.1 | 5.3 | 0.04 |
| Example 6 | 43 | 19 | 1.2 | 2.9 | 0.02 |
| Example 7 | 45 | 21 | 2.4 | 3.2 | 0.03 |
| Example 8 | 45 | 21 | 18.3 | 3.1 | 0.03 |
| Example 9 | 47 | 25 | 3.8 | 4.3 | 0.05 |
| Comparative Example 1 | 5 | 45 | 0.8 | 8.4 | 2.90 |
| Comparative Example 2 | 0 | 57 | 0 | 329.5 | 0.10 |
| Comparative Example 3 | 7 | 45 | 1.1 | 215.0 | 0.09 |
| Comparative Example 4 | 10 | 59 | 0.05 | 1100.0 | 0.08 |
| Comparative Example 5 | 49 | 48 | 4.1 | 787.0 | 0.07 |
| Comparative Example 6 | 48 | 59 | 4.3 | 859.8 | 0.07 |
| Reference Example 1 | 28 | 32 | 0.08 | 815.6 | 0.08 |
| Reference Example 2 | 48 | 31 | 24.9 | 11.7 | 0.02 |

Figure 9:
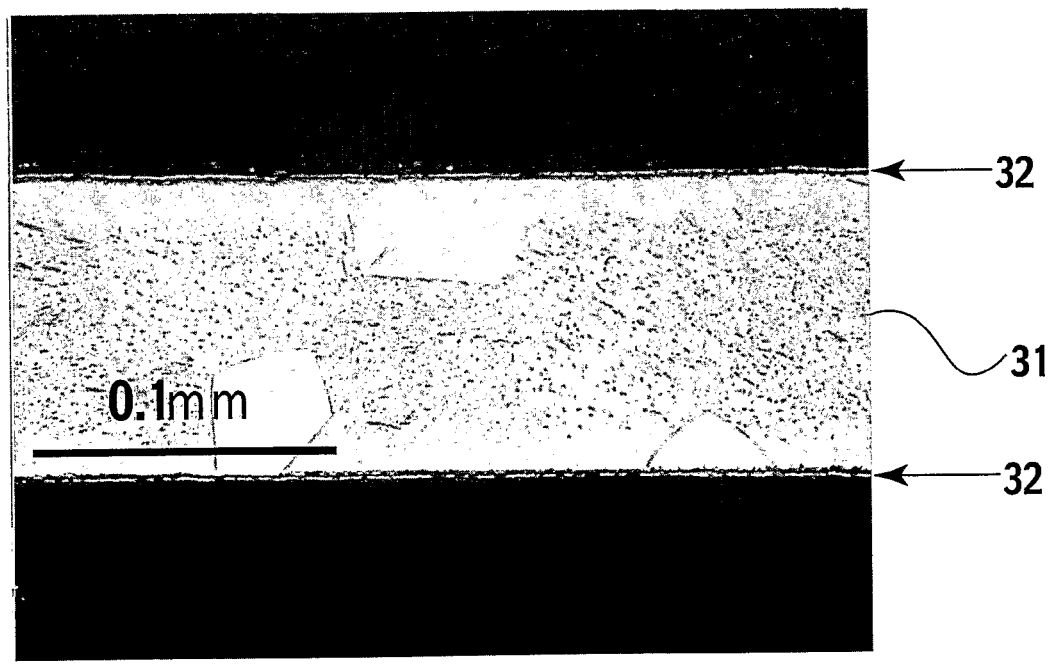
FIG. 9 is a picture of a cross section of the sample obtained by Example 1.

Next, a picture of a cross-sectional organization (magnification: 400 times) of the sample obtained in Example 1 by means of the optical microscope is shown in FIG. 9. In FIG. 9, it is understood that nitride compound layers 32 are formed on both surfaces of a base material 31.

Moreover, as shown in Table 3, in all Examples 1 to 9 where the thicknesses of the nitride compound layers range from 0.1 to 20 μm, the values of the contact resistances were 10 mΩ·cm² or less. As opposed to this, in Comparative Example 2 where the nitride compound layer was not formed, the value of the contact resistance was high. Moreover, in Comparative Example 3 where the gas nitrocarburizing treatment was performed, the value of the contact resistance became a farther higher value than that of Comparative Example 2. Furthermore, in Comparative Example 4 where the plasma nitriding treatment was performed at the low temperature, and in Comparative Examples 5 and 6 in each of which the plasma nitriding treatment was performed at the high temperature, the values became significantly high values.

In the fuel cell, a theoretical voltage per unit cell is 1.23V. However, a voltage that can be actually taken out drops owing to reaction polarization, gas diffusion polarization, and resistance polarization. As a taken-out current is increased, the voltage drops. Moreover, for use in the vehicle, it is desired that an output density per unit volume/weight be increased, and accordingly, the fuel cell is used on a higher-current side than in the stationary use, for example, at a current density of 1 A/cm². It is conceived that, when the current density is 1 A/cm², the decrease of the efficiency owing to the contact resistance can be restricted if the contact resistance of the separator and the carbon paper is 10 mΩ·cm². In all Examples 1 to 9, each value of the contact resistances is 10 mΩ·cm² or less, and accordingly, electromotive force per unit cell is high, and it is made possible to form a fuel cell stack in which the electromotive force is high.

Next, from results of the corrosion current densities, it is understood that, in all Examples 1 to 9 in each of which the base material is titanium and the thickness of the nitride compound layer is within the range of 0.1 to 20 μm, the corrosion current densities are lower than that of Comparative Example 2 where the nitriding treatment was not performed, and that Examples 1 to 9 are excellent in corrosion resistance. As opposed to this, it is understood that the corrosion current density in Comparative Example 1 using the stainless steel as the base material is high, and that Comparative Example 1 is inferior in corrosion resistance though the value of the contact resistance is low. As a reason for this, it is conceived that a micro-crack occurs in the nitride compound layer during the molding, leading to the decrease of the corrosion resistance.

Moreover, in Comparative Example 3 using the gas nitrocarburizing, Comparative Example 4 where the plasma nitriding treatment was performed at the low temperature, and Comparative Examples 5 and 6 where the plasma nitriding treatment was performed at the high temperature, as a result of each thereof, the corrosion resistance was inferior to some extent to those of Examples 1 to 9. In the case of performing the treatment by the gas nitrocarburizing, it is conceived that the content of oxygen in the nitride compound layer is increased because the oxygen pressure in the nitriding treatment atmosphere is high, leading to the increase of the value of the contact resistance. Moreover, in the case of performing the plasma nitriding for the industrial pure titanium at the temperature lower than 500° C. like Comparative Example 4, the content of nitrogen on the surface of the nitride compound layer is low, and the content of oxygen is increased. Accordingly, it is conceived that, though the corrosion current density after the potentiostatic electrolysis is low enough to satisfy the corrosion resistance, the contact resistance with the carbon paper is large, leading to the deterioration of the electrical conductivity.

Moreover, in the case of performing the plasma nitriding for the industrial pure titanium at the temperature exceeding 890° C. like Comparative Examples 5 and 6, both contents of nitrogen and oxygen on the uppermost surface of the nitride compound layer are increased. Accordingly, it is conceived that, though the corrosion current density after the potentiostatic electrolysis is low enough to satisfy the corrosion resistance, the contact resistance with the carbon paper is large, leading to the deterioration of the electrical conductivity.

Moreover, in Reference Example 1, the nitriding treatment was performed at 600° C. However, when the treatment time is as short as 1 minute, the nitrogen content on the surface of the nitride compound layer is decreased as in Comparative Example 4. Accordingly, it is conceived that the contact resistance with the carbon paper is large, leading to the deterioration of the electrical conductivity.

Furthermore, as shown in Example 4, even if the plate thickness is 0.05 mm, the value of the contact resistance and the corrosion current density obtained were as low as that in the case where the plate thickness is 0.1 mm. As described above, both of the electrical conductivity and the corrosion resistance are excellent even if the plate thickness is thin, and accordingly, it is shown that it is made possible to restrict material cost to be low.

Note that, as shown in Reference Example 2, the nitride compound layer good in conductivity is obtained when the plasma nitriding treatment is performed for a long time. However, when the thickness of the nitride compound layer exceeds 20 μm, the value of the contact resistance with the carbon paper is increased. Accordingly, it is shown that the electrical conductivity is decreased.

From the measurement results described above, the separators of Examples 1 to 9 show the contact resistances which are lower than those of the separators of Comparative Examples 1 to 6, and in addition, the corrosion current densities are low, and the corrosion resistances are excellent.

Note that, though titanium of the JIS Class 1 was used as the base material in this embodiment, the base material is not limited to this. It is conceived that a similar effect can be obtained even in the case of using titanium of the JIS Class 2 if the level of oxygen during the nitriding treatment can be suppressed to a low level.

Moreover, though it is preferable to perform the nitriding treatment for approximately 5 to 60 minutes, the treatment for 5 to 10 minutes is more preferable because it is required to complete the treatment in a time as short as possible in terms of cost. Moreover, also for the purpose of preventing the nitride compound layer from being fragile, it is preferable to perform the treatment at a temperature as low as possible in the range from 500 to 882° C.

Next, the effectiveness of the titanium nitride phase in the nitride compound is specifically described based on Examples 10 to 19 and Comparative Examples 7 to 10.

(Preparation of Sample)

In each of Examples 10 to 19, industrial pure titanium similar to that of Example 1 was used as the base material. Then, the plasma nitriding treatment was performed for the respective base materials, and samples as shown in FIG. 10 were obtained. For the nitriding treatment, conditions were changed as appropriate within the following ranges: a temperature: 300° C. to 800° C.; a time: 5 to 45 minutes; a gas mixing ratio ($N_2$: $H_2$): 1:3 to 3:1; and a treatment pressure: 3 Torr to 7 Torr.

In Comparative Examples 7 to 9, samples were prepared by using similar method to those of Examples 10 to 19 except that the conditions of the plasma nitriding treatment were changed. Moreover, in Comparative Example 10, one was used, in which titanium similar to those of the respective Examples was degreased and cleaned, and then was not subjected to the plasma nitriding treatment.

For the obtained respective samples of Examples 10 to 19 and Comparative Examples 7 to 10, the respective characteristics were evaluated by using methods to be described below.

(Identification of Nitride Compound Layer)

Identification of the nitride compound layer was performed by X-ray diffraction measurement. Note that measurement conditions for X-ray diffraction were set as: a radiation source: a CuKα ray; a diffraction angle: 20° to 100°; and a scan speed: 2°/min.

(Nonstoichiometric Composition in Titanium Nitride Phase)

The value of x of TiNx on the surface of the titanium nitride phase and the amount (atom %) of nitrogen in the titanium nitride phase were measured by the Auger electron spectroscopy.

(Activity ($a_{Ti}$) in Titanium Nitride Phase)

The phase diagram construction method as an activity estimation method for use in the chemical thermodynamics was used. The activity ($a_{Ti}$) of titanium in TiNx was estimated by using an expression: $a_{Ti}=(1.04-x)\times 0.45$.

(Thickness of Nitride Compound Layer)

The thickness of the nitride compound layer was obtained in a similar way to Example 1.

(Composition of Surface of Nitride Compound Layer)

The composition of the surface means a composition in a range of 5 nm depth from the surface. In these examples, the amount of nitrogen on the surface was measured. The measurement was performed by the depth profile of the Auger electron spectroscopy.

(Value of Contact Resistance)

The value of the contact resistance was measured in a similar way to Example 1. Note that the value of the contact resistance was measured both of before and after a corrosion resistance test to be described later. The contact resistance after the corrosion resistance test is measured, and thus a function to maintain the low contact resistance in an acidic atmosphere simulating an environment to which the fuel cell is exposed can be evaluated.

(Corrosion Resistance)

With regard to the corrosion resistance, a center portion of each sample of Examples and Comparative Examples was cut into a size of 30 mm×30 mm, the above-described potentiostatic electrolysis was performed therefor, thereafter, an elution amount of ions was measured, and a degree of lowering of the corrosion resistance was evaluated.

For the respective Examples and the respective Comparative Examples, the crystal structures of titanium nitride phases in the nitride compound layers, and the respective values of the amount (atom %) of nitrogen in the titanium nitride phase, x in TiNx, the activity of titanium in the titanium nitride phase, the thickness (μm) of the nitride compound layer, the amount (atom %) of nitrogen from the surface to the depth of 5 nm, the contact resistance before and after the corrosion resistance test, and the elution amount of titanium ion in the corrosion resistance test are shown in FIG. 10.

As shown in FIG. 10, in Examples 10 to 19 in each of which the surface of the nitride compound layer has the titanium nitride phase, the amount of nitrogen in the titanium nitride phase is 37 atom % or more, and x in TiNx is: $x \geq 0.6$, the value of the contact resistance before and after the corrosion resistance test was 50 mΩ·cm² or less. Among them, in Examples 10 to 13 and Examples 16 to 19 in each of which the amount of nitrogen in the titanium nitride phase is 45 atom %, and x in TiNx is: $x \geq 0.8$, the value of the contact resistance before and after the corrosion resistance test was 10 mΩ·cm² or less, and it was proven that the value of the contact resistance was hardly changed before and after the corrosion resistance test, and that the corrosion resistance was not lowered even after the corrosion test. As opposed to this, in Comparative Example 10 where the nitride compound layer was not formed, the value of the contact resistance was extremely high irrespective of before or after the corrosion resistance test. Moreover, in Comparative Examples 7 to 9, though the nitride compound layer was formed on the surface of the base material, $Ti_2N$ in which the activity of titanium is high or α-Ti in which nitrogen is solved solidly is generated because the amount of nitrogen was small. Therefore, though the value of the contact resistance before the corrosion resistance test was low, the value of the contact resistance after the corrosion resistance test was increased. As a result, it was proven that, in Comparative Examples 7 to 9, the low contact resistance cannot be maintained in the acidic atmosphere simulating a service condition of the fuel cell, and the nitride compound layer does not exhibit high stability.

Moreover, the value of the contact resistance of each of Examples 10 to 19 is a value equal to or less than 10 mΩ·cm², and accordingly, the fuel cell stack in which the electromotive force per unit cell is high can be formed.

The entire contents of Japanese Patent Applications No. 2004-117976 with a filing date of Apr. 13, 2004 and No. 2004-252947 with a filing date of Aug. 31, 2004 are herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

In the fuel cell separator according to the present invention, the contact resistance which occurs between the gas diffusion layer and the separator is low, the corrosion resistance is excellent, and the separator can be manufactured at low cost. Moreover, the fuel cell stack using this separator is compact and lightweight, and has high power generation efficiency.

The invention claimed is:

1. A fuel cell separator, comprising:
a base material formed of titanium; and
a nitride compound layer comprising titanium and nitrogen and provided on a surface of the base material,
wherein the nitride compound layer includes a titanium nitride phase within a range of a depth of 20 nm from a surface that is on a side contacting an electrode, and the titanium nitride phase is formed of a crystal structure where a nitrogen atom enters a gap position of an octahedron in a face-centered cubic lattice of titanium,
wherein in a range of a depth of 5 nm from a surface of the nitride compound layer, this surface contacting an electrode, an amount of nitrogen is 30 atom % or more, and an amount of oxygen is 30 atom % or less,
and wherein in a range of a depth of 10 nm from a surface of the nitride compound layer, this surface contacting an electrode, a content of nitrogen is equal to or more than a content of oxygen.

2. The fuel cell separator according to claim 1, wherein an amount of nitrogen in the titanium nitride phase is 37 atom % or more.

3. The fuel cell separator according to claim 2, wherein the amount of nitrogen in the titanium nitride phase is 45 atom % or more.

4. The fuel cell separator according to claim 1, wherein, in a case of expressing a nonstoichiometric composition of the titanium nitride phase as $TiN_x$, x is within a range of $0.6 \leq x \leq 1.05$.

5. The fuel cell separator according to claim 4, wherein the x is within a range of: $0.8 \leq x \leq 1.05$.

6. The fuel cell separator according to claim 1, wherein the titanium nitride phase is present on the surface that is on the side of the nitride compound layer, and the titanium nitride phase occupies 50% or more of a surface area of the surface that is on the side of the nitride compound layer.

7. The fuel cell separator according to claim 1, wherein an activity of titanium in the titanium nitride phase is 0.2 or less when an activity of titanium in the base material is set at 1.

8. A method of manufacturing a fuel cell separator, comprising:
preparing a base material formed of titanium; and
performing a plasma nitriding treatment for forming a nitride compound layer formed of titanium and nitrogen on a surface of the base material,
wherein the plasma nitriding treatment is performed at a temperature from 500° C. or more to less than 890° C.

9. The method of manufacturing the fuel cell separator according to claim 8, further comprising: press-molding the base material into a shape of the fuel cell separator, the press molding being performed after the plasma nitriding treatment.

10. An apparatus, comprising:
a fuel cell stack, wherein the fuel cell stack includes the fuel cell separator according to claim 1.

11. An apparatus, comprising:
a fuel cell vehicle,
wherein the fuel cell vehicle comprises:
a fuel cell stack including the fuel cell separator according to claim 1.

* * * * *